(12) United States Patent
Adams

(10) Patent No.: US 6,317,571 B1
(45) Date of Patent: Nov. 13, 2001

(54) PRINTER FUSER HEATER CONTROLLER WITH POWER FACTOR CORRECTION

(75) Inventor: Jerry F. Adams, Waterport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/578,738

(22) Filed: May 25, 2000

(51) Int. Cl.$^7$ .......................... G03G 15/00; G03G 15/20
(52) U.S. Cl. ................................. 399/67; 399/88
(58) Field of Search ................ 399/33, 37, 67, 399/69, 88, 335

(56) References Cited

U.S. PATENT DOCUMENTS

| | | | |
|---|---|---|---|
| 5,627,628 | * | 5/1997 | Soda et al. ........................... 399/69 X |
| 5,942,882 | * | 8/1999 | Ohta ...................................... 323/282 |
| 6,018,151 | * | 1/2000 | Hirst .................................. 399/335 X |
| 6,111,230 | * | 8/2000 | Cao et al. ........................... 399/69 X |
| 6,177,739 | * | 1/2001 | Matsudaira et al. ................ 399/88 X |

FOREIGN PATENT DOCUMENTS 9-218720 * 8/1997 (JP).

OTHER PUBLICATIONS

Integrated Circuits UNITRODE, 5/93, pp. 5–226–5–228, "Enhanced High Power Factor Preregulator".
Integrated Circuits UNITRODE, 2/93A, pp. 5–218–5–225, "High Power Factor Preregulator".

* cited by examiner

*Primary Examiner*—Fred L Braun
(74) *Attorney, Agent, or Firm*—John M. Kelly; David E. Henn

(57) ABSTRACT

Power factor control in an AC powered machine having multiple input electrical power requirements. AC input power is continuously applied to a low input power load and selectively to a high input power load. The AC power to the high input power load is pulse modulated to have an input power that depends upon the input AC line voltage and upon the input AC line current. The pulse modulated AC power is controlled such that the total AC input power remains less than a design limit. If the high input power load is a heater, the pulse modulated AC power also depends on the heater's temperature.

18 Claims, 7 Drawing Sheets

PRINTER FUSER HEATER CONTROLLER WITH POWER FACTOR CORRECTION

FIELD OF THE INVENTION

This invention relates to printers and copiers having heater controllers. In particular, it relates to improving machine power factors using pulse-width-modulation heater controllers.

BACKGROUND OF THE INVENTION

Business machines are often powered by alternating current (AC) supplied via standard power lines. With some machines the required power line AC input varies widely over time. For example, electrophotographic marking machines usually include fusers that produce permanent images by using heat and pressure to fuse toner with substrates, such paper. Such fusers generally use temperature-controlled, AC powered fuser heaters that require large amounts of electrical power when initially heating a pressure roller to a using temperature, less power when actually fusing, and even less power when in stand-by. The fuser heater temperature depends on, among other factors, the electrical power applied to the fuser heater. Other alternating current (AC) business machines also have widely varying electrical power requirements. For example, high volume ink jet printers frequently include AC powered heaters that remove moisture from inked paper to prevent ink smearing. Again, the AC electrical power applied to a heater is usually controlled such that the proper drying temperature is achieved. It should be noted that the AC heaters discussed above are frequently high-power devices that require substantial currents.

Heater temperature regulation is usually performed by a heater controller that limits the electrical power to the heater such that the heater does not overheat (which wastes energy, reduces operating lifetimes, and presents a fire and burn hazard). Prior art heater controllers include simple ON/FF switching devices, cycle stealing, and AC phase control devices. While generally successful, such prior art heater controllers have problems. ON/OFF power switching and cycle stealing lead to low apparent power factors and voltage fluctuations that can cause loss of data while phase control can produce high harmonic content signals, low apparent power factors, and interference with other devices. Indeed, European standards can be difficult to meet using any prior art heater controller.

Low apparent power factors are a significant problem. Consider a machine designed to draw less than 1380 volt-amps. This power rating can be achieved using a 15-ampere service connection. However, a low apparent power factor can cause the instantaneous line current to greatly exceed 15-ampere, even though the time-averaged current may be well below 15-ampere.

In addition to a high power heater, most AC powered business machines also have other electrical power requirements. For example, electrophotographic marking machines have photoreceptor chargers that require high voltages at low currents and electronic subsystems that require low voltages at high currents. Implementing multiple power requirements can be difficult. For example, voltage fluctuations caused by switching power to and from AC heaters can cause lamps to flicker and potential loss of valuable system information.

In view of the foregoing, a new technique of controlling AC heater loads in business machines having multiple power requirements would be useful.

SUMMARY OF THE INVENTION

The principles of the present invention provide for power factor control in machines having multiple electrical power requirements. A machine according to the principles of the present invention receives AC input power, powers at least one relatively low input-current device with the AC input power, and selectively applies relatively high current, high frequency pulse modulated AC power to another AC load. The high frequency pulse modulated AC power is controlled so as to be proportional to the input AC line voltage and to the input AC line current. If the AC load is a heater the high frequency pulse modulated AC power is also controlled to depend on the heater's temperature. The high frequency pulse modulated AC power is further controlled such that the total AC input power remains less than a design limit.

Beneficially, if the AC load is a printer heater, and if the high frequency pulse modulated AC power cannot maintain the heater's temperature while maintaining the total AC input power below a predetermined value, the printer's operation slows down until both the heater temperature and the total AC input power are within design limits.

BRIEF DESCRIPTION OF THE DRAWINGS

Other aspects of the present invention will become apparent as the following description proceeds and upon reference to the drawings, in which.

DETAILED DESCRIPTION OF A PREFERRED EMBODIMENT

While the principles of the present invention will be described in connection with a digital copier, it should be understood that the present invention is not limited to that embodiment or to that application. Therefore, it is should be understood that the principles of the present invention extend to all alternatives, modifications and equivalents as may be included within the spirit and scope of the appended claims. Furthermore, since the art of digital copying is well known, the various processing stations employed in the illustrated digital copier are shown only schematically and their operations described only briefly.

Figure 1:
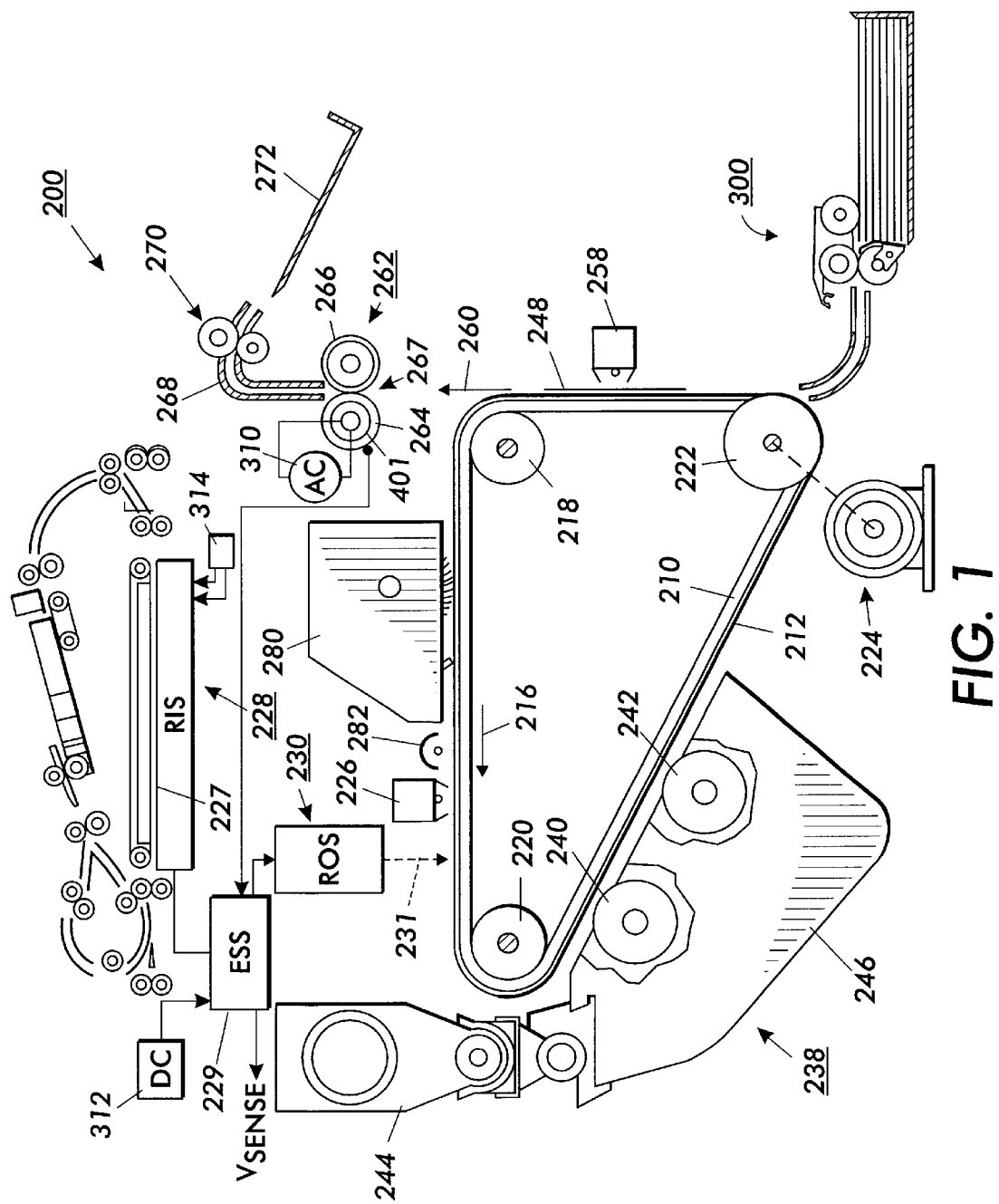
FIG. 1 schematically illustrates an electrophotographic printing machine suitable for incorporating the principles of the present invention.

Refer now to FIG. 1 for a schematic depiction of a digital copier 200 that is suitable for incorporating the principles of the present invention. In operation, an original document that is to be copied is positioned on a platen 227 of a raster input scanner 228. The raster input scanner contains document illumination lamps, optics, a mechanical scanning drive, and a charge coupled device (CCD) array. The raster input scanner electrically captures the image of the original document and converts it into a series of raster scan lines. This information is transmitted to an electronic subsystem 229, which controls a raster output scanner 230 described below.

The digital copier further includes an electrophotographic printing machine that generally employs a belt 210 having a photoconductive surface 212. The belt 210 moves in the direction 216 so as to advance successive portions of the photoconductive surface 212 sequentially through the various processing stations disposed about the belt. The belt 210 is entrained about a stripping roll 218, a tensioning roll 220 and a drive roll 222. The drive roll 222 is rotated by a motor 224 such that the belt 210 advances in the direction 216.

Initially, a portion of the belt 210 passes by a corona generating device 226 that charges the photoconductive surface 212 to a relatively high, substantially uniform potential. After the photoconductive surface is charged, the charged portion is advanced past the raster output scanner (ROS) 230.

The raster output scanner 230 receives modulation signals from the electronic subsystem 229 that causes the raster output scanner 230 to produce a modulated laser beam 231. Beneficially the electronic subsystem is under the control of a dedicated minicomputer that controls and synchronizes the overall operation of the digital copier 200. The raster output scanner includes a rotating, multi-faceted polygon mirror and optical systems that sweep the modulated laser beam 231 as a light spot across the photoconductive surface 212. The sweeping laser beam, together with the advancement of the belt 210 in the direction 216, cause the charged photoconductive surface to be raster scanned with the modulated laser beam, thereby recording an electrostatic latent image of a desired image.

After being recorded, the electrostatic latent image advances to a development station where toner, in the form of liquid or dry particles, is deposited on the electrostatic latent image. Preferably, the development station is a magnetic brush developer 238 having magnetic brush developer rolls 240 and 242. Those rolls form a brush of carrier granules and toner particles that extend near the photoconductive surface 212. The electrostatic latent image attracts toner particles from the carrier granules, forming a toner powder image. The magnetic brush developer further includes a toner particle dispenser 244 that dispenses toner particles into a developer housing 246 as required.

After the electrostatic latent image is developed, the toner powder image advances to a transfer station where a substrate 248, such as a sheet of paper, is directed into contact with the latent image. A corona generating device 258 then sprays ions onto the back side of the substrate 248. This causes toner to transfer from the photoconductive surface 212 onto the substrate. After transfer, the substrate advances in the direction 260 into a fusing station 262.

The fusing station permanently affixes the transferred toner to the substrate 248. The fuser assembly 262 includes a heated fuser roll 264 and a back-up roll 266 that form a nip 267. The substrate 248 passes between the fuser roll 264 and the back-up roll 266 such that the toner contacts the fuser roll 264. Heat and pressure in the nip permanently affix the toner to the substrate 248. After fusing, the substrate advances through a chute 268 and a drive roll assembly 270 to catch tray 272 for subsequent removal by the operator.

After the substrate separates from the photoconductive surface 212 there may be residual toner, paper fibers, or other debris remaining on the photoconductive surface 212. Such debris is removed at a cleaning station 280. After cleaning a discharge lamp 282 floods the photoconductive surface 212 with light to dissipate any residual electrostatic charges in preparation for the next imaging cycle.

The foregoing description is sufficient for purposes of the present application to illustrate the general operation of a digital copier that incorporates the principles of the present invention. It should be understood that the digital copier has numerous electrical power requirements. For example, the fuser roll requires relatively high voltage, high current AC electrical power to heat the fuser roll as required for proper fusing. That electrical power is supplied by an AC power supply 310. Furthermore, the electronic subsystem 229 requires a relatively low DC voltage at relatively high current. That electrical power is supplied from a DC power supply 312. Additionally, the raster input scanner 228 might require positive and negative DC voltages at medium voltage levels with low currents. That electrical power is supplied by a DC power supply 314. Of course, other stations might require other power supplies for proper operation. For example, the charger 226 might require a very high negative voltage at very small currents. However, these voltages are all derived from an AC input line, such as 115 VAC. The principles of the present invention relate to improving the power factor of the AC input power.

Figure 2:
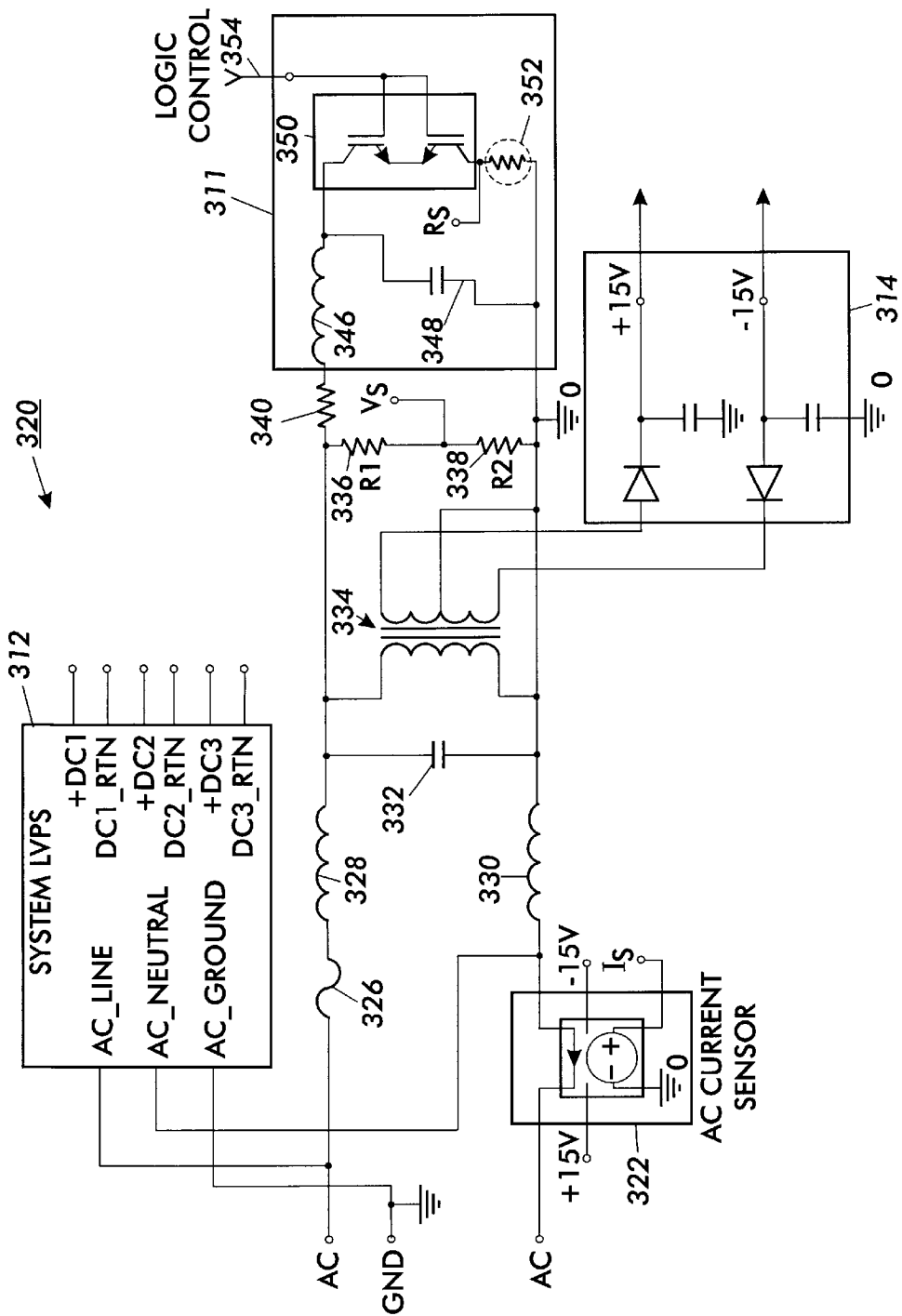
FIG. 2 schematically illustrates AC input power driving multiple AC powered devices, wherein one device is a heater whose input power is controlled by a pulse modulation fuser heater controller.

FIG. 2 schematically illustrates a power supply system 320 suitable for use with the digital copier 200. That power supply system includes a heater controller 311, the DC power supply 312, and the DC power supply 314. The power supply system 320 has two AC input legs and a ground. One of those legs is applied to an AC current sensor 322. That sensor produces a voltage signal, Is, that is proportional to the current into the digital copier 320 from the AC power line. Significantly, the current sensor 322 is positioned such that all current into the power supply system 320 passes through the current sensor 322. Connected between the output side of the AC current sensor and the other AC input leg is the DC power supply 312. Using the AC input power the power supply 312 produces DC voltages as required.

Also connected between the AC current sensor 322 and the other AC input leg is an input filter comprised of fuse 326, inductors 328 and 330, and a capacitor 332. The fused and filtered AC input, which is available across the capacitor 332 is subsequently applied to a transformer 334. The transformer transforms the fused and filtered AC input and applies the resulting transformed AC voltage to the DC power supply 314, which produces its DC voltages as required. For example, the DC power supply 314 produces +15 and −15 volts, which power the AC current sensor 322 (as well as the RIS as shown in FIG. 1).

The fused and filtered AC input across the capacitor 332 is also applied across a series connection of two resistors, the resistors 336 and 338. The voltage developed across the resistor 338 is a voltage signal Vs that depends upon the voltage across the capacitor 332, and consequently upon the AC voltage input to the power supply system 320.

Connected to one leg of the fused and filtered AC input across the capacitor 332 is a fuser heater 340. The fuser heater is physically located inside the fuser roll 264. When power passes through the fuser heater the fuser roll is heated to the proper fusing temperature. FIG. 1 shows the fuser roll 264 connected to an AC power supply 310. That AC power supply is comprised of the fused and filtered AC input and the heater controller 311.

As shown in FIG. 2, the heater controller includes a low pass filter comprised of an inductor 346 and a capacitor 348, a logic level controlled AC switch 350, and a resistor 352. The logic level controlled AC switch 350 provides for rapid, high speed switching of current through the fuser heater 340, while the inductor 346 and the capacitor 348 provide high frequency filtering of the switched power. The logic level controlled AC switch 350 beneficially includes an insulated gate bipolar transistor that is enclosed within a bridge rectifier. Alternatively, a MOSFET, IGBT, or bipolar transistor within a bridge rectifier or series opposed could be used. The operation of the AC switch 350 depends upon the state of a Logic Control signal input on a line 354.

In addition to the elements shown in FIG. 2, FIG. 1 shows a thermistor 410 that is in thermal communication with the fuser roll 264 such that the resistance of that thermistor depends upon the temperature of the fuser roll. That resistance is sensed by the electronic subsystem 229, which then produces a voltage Vsense. Vsense represents the difference between a desired fuser roll temperature and the temperature sensed by the thermistor 410.

From above it can be understood that the power supply system 320 produces three signals: Is, which depends upon the current into the power supply system; Vs, which depends upon the voltage applied to the power supply system; and Rs, which depends upon the current through the fuser heater 340. Those signals are used to improve the power factor of the AC input power. However, before those signals are used they are processed as shown in FIG. 3, which schematically illustrates analog signal processing of those signals.

Figure 3:
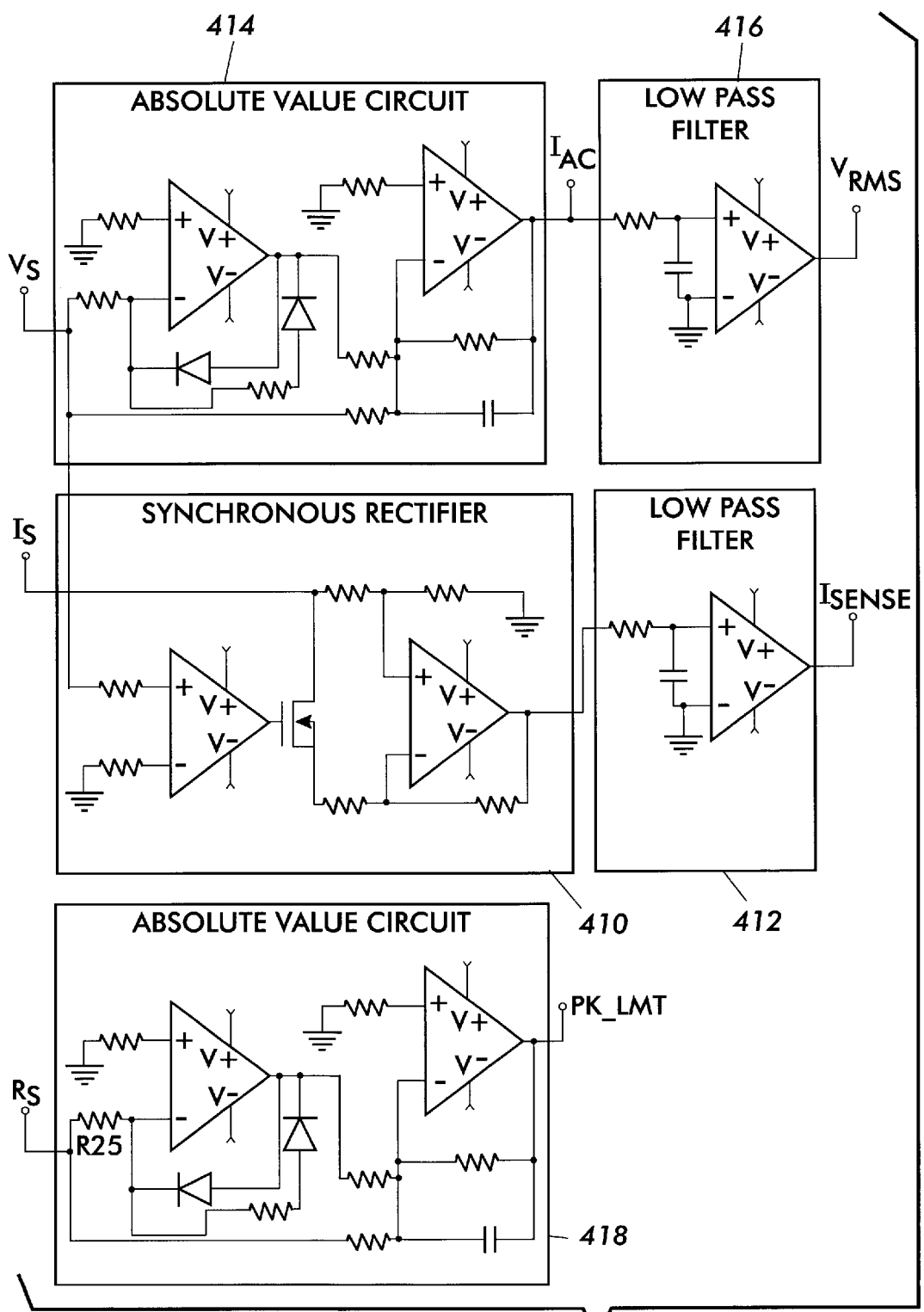
FIG. 3 schematically illustrates analog signal processing of a plurality of sensed signals that are derived from the schematic of FIG. 2.

Referring now to FIG. 3, the signal Is is applied to a synchronous rectifier circuit 410 that rectifies that signal in synchronization with the line voltage and applies the rectified version to a low pass filter 412. The output of the low pass filter 412 is a voltage level called Isense that depends upon the current into the power supply system 320. The signal Vs is applied to an absolute value detector circuit 414. The output of the absolute value detector circuit 414 is a signal called Iac that is applied to a low pass filter 416. The output of the low pass filter 416 is a voltage level called Vrms that depends upon the line voltage into the power supply system 320. Finally, the signal Rs is applied to an absolute value detector circuit 418. The output of the absolute value detector circuit 418 is a voltage signal called PK_LMT that depends upon the current into the heater controller.

Figure 4:
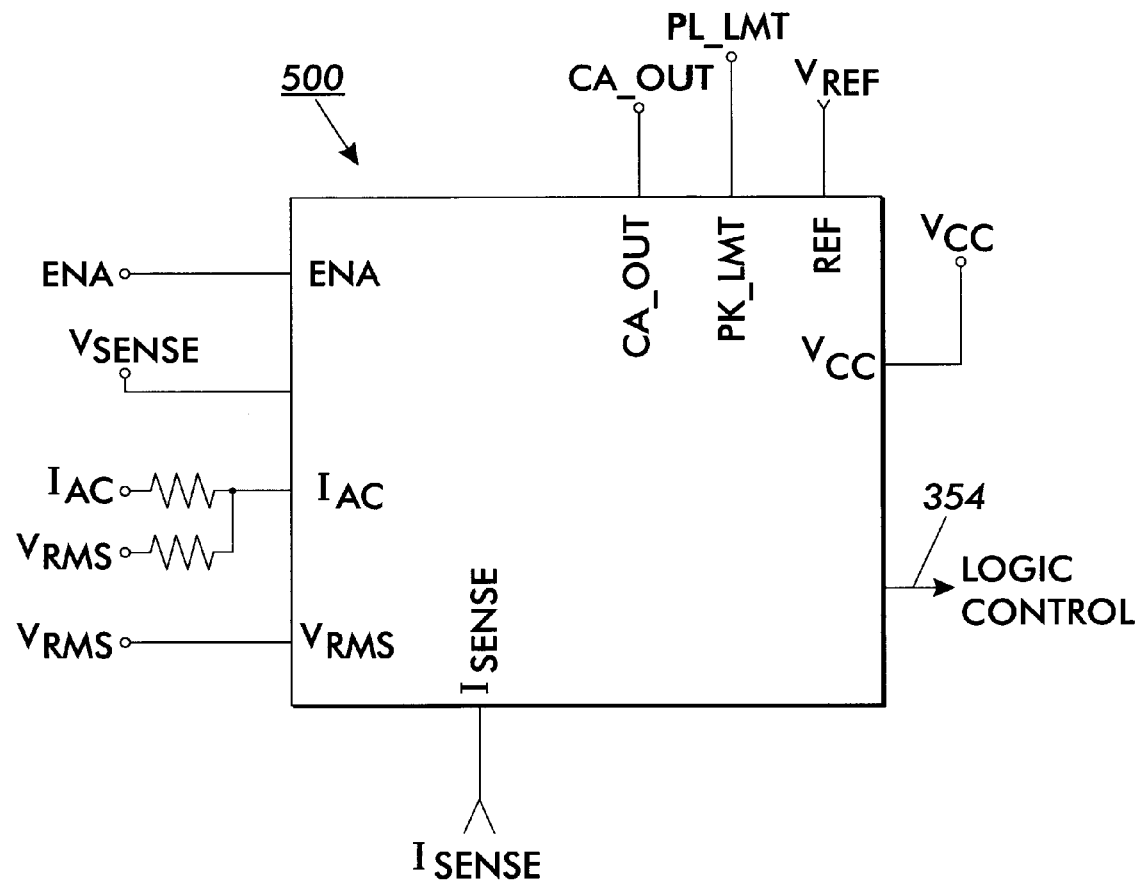
FIG. 4 schematically illustrates a pulse width modulation processor for producing control signals for the fuser heater controller shown in FIG. 2.

Referring now to FIG. 4, the signals Isense, Vrms, Iac, and PK_LMT (reference FIG. 3) and the signal Vsense from the electronic subsystem (which depends upon the fuser roll temperature error) are applied to a pulse width modulator controller 500. Also applied to the pulse width modulator controller 500 are an enable signal ENA, an operating supply voltage Vcc, and a reference voltage Vref. With an operating supply voltage Vcc applied to the pulse width modulator controller 500, and with the enable signal ENA present, the pulse width modulator controller 500 begins active operation.

Active operation of the pulse width modulator controller 500 involves high frequency modulation of the power to the fuser heater 340 by way of logic control signals on line 354. Fuser heater power modulation is controlled such that the machine's AC input current has a substantially sinusoidal waveform that is a) in-phase with the instantaneous line voltage, b) inversely proportional to the AC input voltage, and c) of a magnitude that is proportional to the difference between the fusing temperature and a desired fusing temperature. The signal Isense represents the machine's input current. Isense is derived from the signal Is, which is produced by the AC current sensor 322. Significantly, the AC current sensor monitors the machine's AC input current, while the pulse width modulator controller 500 controls only the power through the fuser heater 340. Also note that the signal Vrms, which is derived from the signal Vs, directly depends on the AC voltage applied to the machine. Essentially, the power supplies 312 and 314 are always powered, while the heater power is controlled so as to maintain the overall AC input power below a predetermined value.

The fusing temperature error is represented by the signal Vsense. The signal PK_LMT provides instantaneous current feedback to the modulator controller 500. The signal Vref is set to a voltage that corresponds to Vsense when the fusing roller temperature is at a desired fusing temperature.

The operation of the pulse width modulator controller 500 depends upon the temperature of the fuser roll. If the fuser roll is near the proper operating temperature the pulse width modulator controller 500 will send logic control signals to the heater controller 311 such that the fuser heater 340 is energized for part of each AC cycle. That part is controlled such that heater current is applied when the instantaneous AC voltage is relatively low. This enables all of the other power supplies to be continuously powered while limiting the instantaneous input power to the machine. This is illustrated with the assistance of FIGS. 5, 6, and 7.

Figure 5:
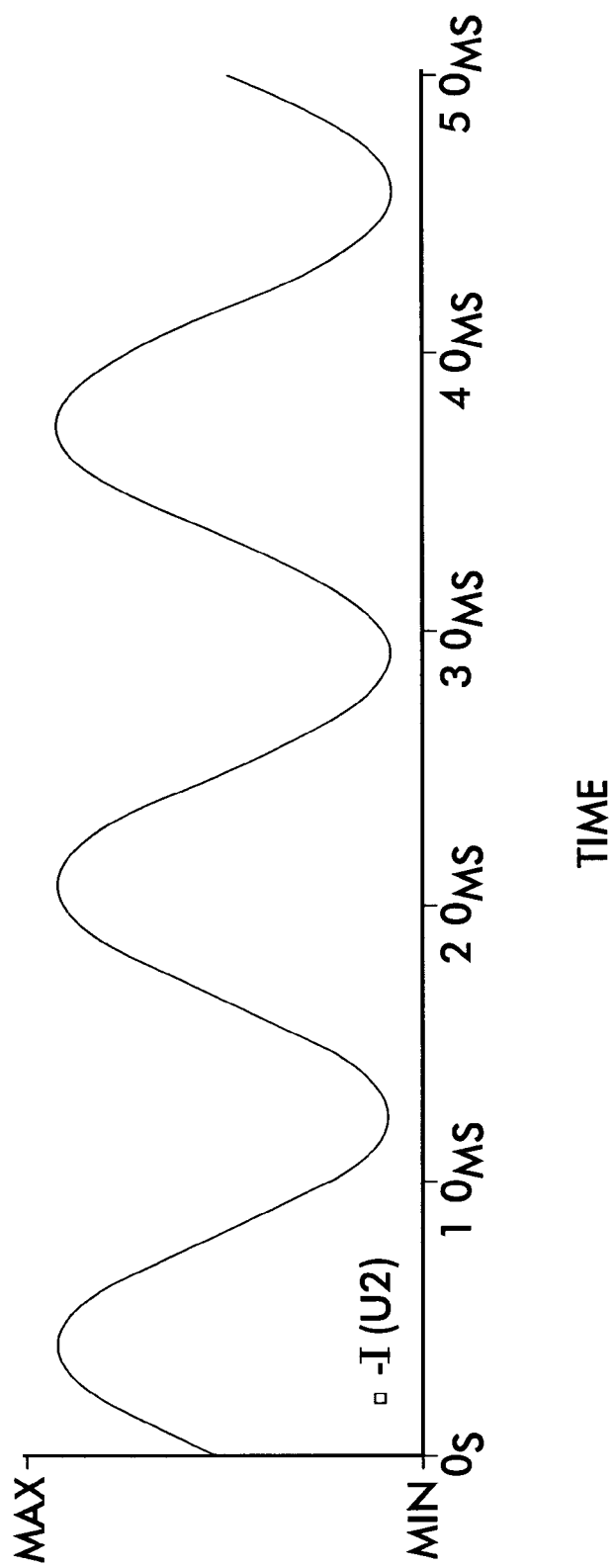
FIG. 5 illustrates an exemplary available current waveform.
Figure 6:
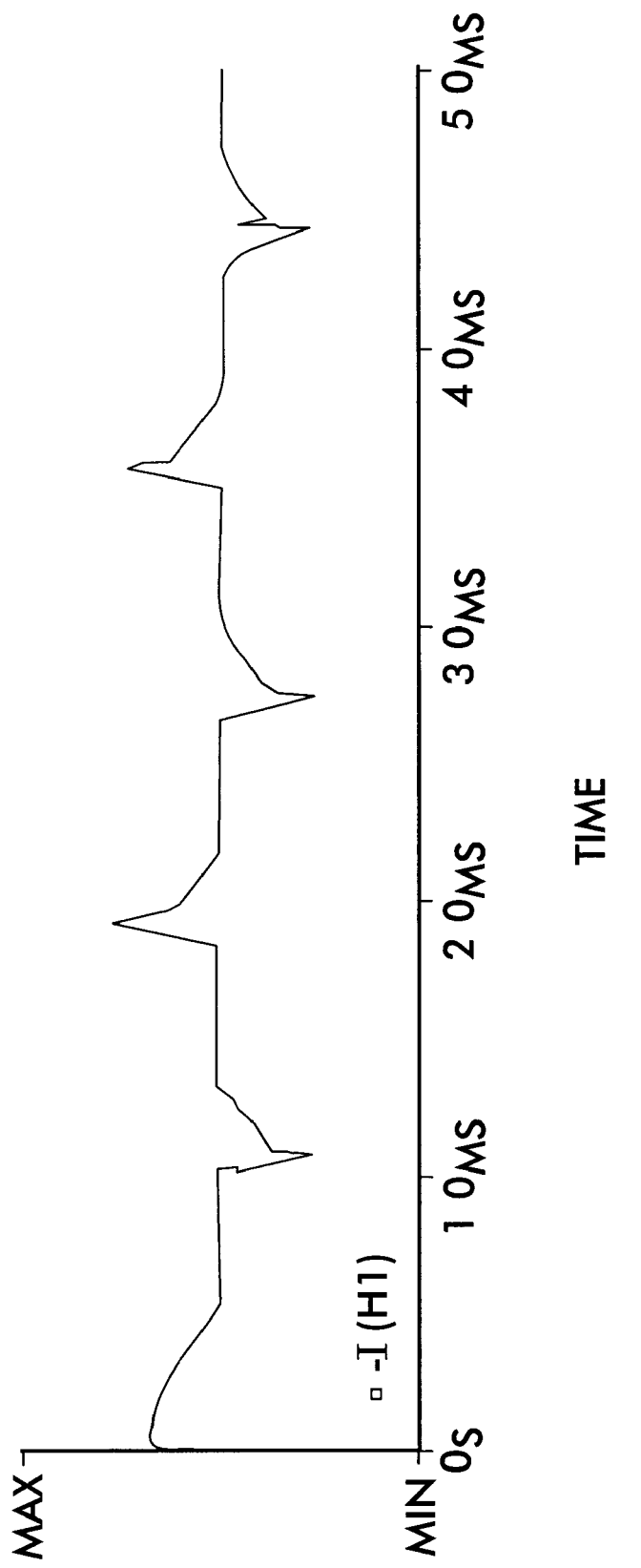
FIG. 6 illustrates an exemplary waveform of current drawn by a systems low voltage power supply.
Figure 7:
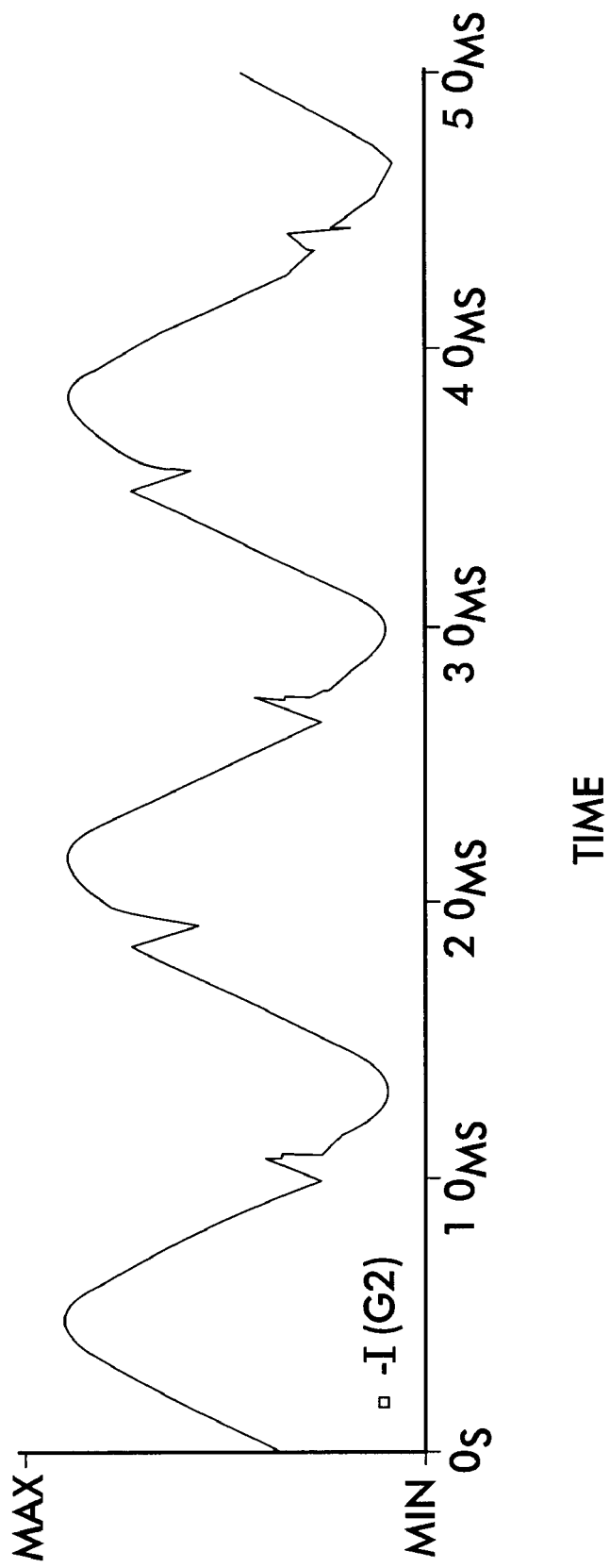
FIG. 7 illustrates an exemplary waveform of current drawn by a fuser controller.

FIG. 5 shows the input current that could be drawn, at a given input voltage, while maintaining the AC input below a predetermined volt-amp setting (say 1380 voltage amps). FIG. 6 illustrates the current drawn by the low voltage power supplies (reference elements 312 and 314 in FIG. 2). FIG. 7 illustrates the current that could be applied to the fuser heater 340. If the fuser roll temperature is well below the desired temperature the current in FIG. 7 would be applied to the fuser roll to bring the fuser temperature to the desired level. With smaller temperature errors a proportional control could supply less amounts of current (charge) per cycle.

When the fuser roll temperature is below some predetermine value, a signal CA-OUT is produced that prevents fusing. For example, the signal CA-OUT might stop machine operation until the fuser roll heats up. In that case the pulse width modulator controller 500 applies the logic control signal to the heater controller 311 such that the fuser heater 340 is energized for most of each AC cycle, except for when the machine's AC input power exceeds a design limit. Thus the current in FIG. 7 would be applied to the fuser heater. Since the machine's AC input power is readily determined from the signals Isense and Vrms, the pulse width modulator controller 500 can determine the machine's instantaneous AC input power and act accordingly.

Finally, when fusing, which produces a temporary drop in the temperature of the fuser heater, the pulse width modulator controller 500 will attempt to increase the fuser heater power by increasing the duration of time that the logic control signal is high. However, if the machine's AC input power exceeds the design limit logic control signals are removed until the next AC cycle occurs. If the fusing temperature drops below an acceptable fusing temperature (a design limit) the signal CA-OUT is produced as described above, which prevents fusing. The result is machine level power factor control by controlling only the power into a heating device.

There are numerous integrated circuits available that can act as the modulator controller 500. For example, reference Unitrode Model UC 1854A Enhanced High Power Factor Preregulator.

Thus, the principles of the present invention provide for power factor control using selective switching of one power-consuming device with other power consuming devices always being powered.

It is to be understood that while the figures and the above description illustrate the present invention, they are exemplary only. Others who are skilled in the applicable arts will recognize numerous modifications and adaptations of the illustrated embodiments that will remain within the principles of the present invention. Therefore, the present invention is to be limited only by the appended claims.

What is claimed:

1. A power factor correction network for an AC powered machine that includes a relatively high input current device and a relatively low input current device, comprising:

an input for receiving AC input power;

a current sensor attached to said input, said current sensor for sensing a magnitude of the line current of said AC input power;

a voltage sensor for sensing the line voltage of said AC input power;

a pulse modulated power switch for selectively applying power to said high input current device, wherein said power to said high input current device is proportional to the sensed line voltage and to said sensed line current;

wherein said AC input power is applied to said relatively low input current device, and wherein said power to said high input current device is controlled such that the AC input power remains less than a design limit.

2. The power factor correction network according to claim 1, wherein said high input current device is a heater.

3. The power factor correction network according to claim 2, wherein the AC powered machine is an electrophotographic marking machine.

4. The power factor correction network according to claim 3, wherein said heater is in a fusing station.

5. The power factor correction network according to claim 4, wherein said heater is within a fuser roll.

6. The power factor correction network according to claim 2, wherein said low input current device is a power supply.

7. A power factor correction network for an AC powered machine that includes a relatively high input current device and a relatively low input current device, comprising:

an input for receiving AC input power;

a current sensor attached to said AC input line, said current sensor for sensing a magnitude of the line current of said AC input power;

an input voltage sensor for sensing the line voltage of said AC input power;

a temperature sensor for producing a temperature signal that depends upon the temperature of the relatively high input current device;

a pulse modulated power switch for selectively applying power to said relatively high input current device, wherein said power to said high input current device is dependent on the sensed line voltage, on the said sensed line current, and on said temperature signal;

wherein said AC input power is applied to said relatively low input current device, and wherein power to said relatively high input current device is controlled such that the AC input power remains less than an input power design limit.

8. The power factor correction network according to claim 7, wherein said high input current device is a heater.

9. The power factor correction network according to claim 8, wherein the AC powered machine is an electrophotographic marking machine.

10. The power factor correction network according to claim 9, wherein said heater is in a fusing station.

11. The power factor correction network according to claim 10, wherein said heater is within a fuser roll.

12. The power factor correction network according to claim 11, wherein said temperature sensor is in thermal contact with said fuser roll.

13. The power factor correction network according to claim 12, wherein said temperature sensor senses a fusing temperature.

14. The power factor correction network according to claim 13, wherein said pulse modulated power switch selectively applies power to said heater such that said fusing temperature remains within temperature design limits.

15. The power factor correction network according to claim 14, farther including a machine controller that slows down the operation of the electrophotographic marking machine when the AC input power would exceed said input power design limit if the fusing temperature was maintained within said temperature design limits.

16. An electrophotographic marking machine, comprising:

a fusing station having a fuser roll, a heater within said fuser roll, and a temperature sensing element for producing a temperature signal that depends upon the fusing temperature of the fuser roll;

an input for receiving AC input power;

a power supply operatively connected to said input, said power supply for producing DC power from said AC input power;

a current sensor attached to said input, said current sensor for sensing a magnitude of the line current of said AC input power;

input voltage sensor for sensing the line voltage of said AC input power; and a pulse modulated power switch for selectively applying power to said heater, wherein said power to said heater is dependent on the sensed line voltage, on the said sensed line current, and on said temperature signal, and wherein said power to said heaters is controlled such that the AC input power remains less than an input power design limit.

17. The electrophotographic marking machine according to claim 16, wherein said pulse modulated power switch selectively applies power to said heater such that said fusing temperature remains within temperature design limits.

18. The electrophotographic marking machine according to claim 16, wherein said fusing station stops fusing when the AC input power would exceed said input power design limit if the fusing temperature was maintained within said temperature design limits.

* * * * *